(12) United States Patent
Froeschle et al.

(10) Patent No.: US 6,976,728 B2
(45) Date of Patent: Dec. 20, 2005

(54) SIDE IMPACT PROTECTION DEVICE AS WELL AS MOTOR VEHICLE DOOR HAVING A SIDE IMPACT PROTECTION DEVICE

(75) Inventors: Mathias Froeschle, Ostfildern (DE); Peter Garnweidner, Lamprechtshausen (AT)

(73) Assignees: Dr. Ing. h.c.F. Aktiengesellschaft, Stuttgart (DE); Euromotive GmbH & Co. KG, Ranshofen (AT)

( * ) Notice: Subject to any disclaimer, the term of this patent is extended or adjusted under 35 U.S.C. 154(b) by 0 days.

(21) Appl. No.: 10/840,419

(22) Filed: May 7, 2004

(65) Prior Publication Data

US 2005/0001443 A1    Jan. 6, 2005

(30) Foreign Application Priority Data

May 9, 2003    (DE) ................ 103 20 971

(51) Int. Cl.$^7$ ................................. B60J 5/00
(52) U.S. Cl. ............... 296/146.6; 296/187.12; 49/502
(58) Field of Search .............. 296/146.6, 187.12, 296/203.03; 280/730.2

(56) References Cited

U.S. PATENT DOCUMENTS

| | | | |
|---|---|---|---|
| 4,307,911 A * | 12/1981 | Pavlik | 296/146.6 |
| 4,411,103 A * | 10/1983 | Ohmura et al. | 49/502 |
| 4,708,390 A * | 11/1987 | Palentyn et al. | 296/146.6 |
| 4,924,630 A * | 5/1990 | Lomasney et al. | 49/502 |
| 5,221,121 A * | 6/1993 | Zichner et al. | 296/146.6 |
| 5,277,470 A * | 1/1994 | Freeman et al. | 296/146.6 |
| 5,417,470 A * | 5/1995 | Holt | 296/146.6 |
| 5,431,476 A * | 7/1995 | Torigaki | 296/146.6 |
| 5,469,668 A * | 11/1995 | Heim et al. | 49/502 |
| 5,470,125 A * | 11/1995 | Yamazaki | 296/146.6 |
| 5,599,057 A * | 2/1997 | Hirahara et al. | 296/146.6 |
| 5,765,622 A * | 6/1998 | Lichy | 160/273.1 |
| 5,800,007 A * | 9/1998 | Cho | 296/146.6 |
| 5,925,314 A * | 7/1999 | Nishiguchi et al. | 420/528 |
| 6,053,565 A * | 4/2000 | Cho | 296/146.6 |
| 6,196,619 B1 * | 3/2001 | Townsend et al. | 296/146.6 |
| 6,220,652 B1 * | 4/2001 | Browne et al. | 296/146.6 |
| 6,328,359 B1 * | 12/2001 | Pacella et al. | 296/146.6 |
| 6,398,289 B1 * | 6/2002 | Gehringhoff | 296/146.6 |
| 6,568,742 B2 * | 5/2003 | Seo | 296/146.6 |
| 6,846,033 B2 * | 1/2005 | Chu et al. | 296/146.6 |
| 6,869,130 B2 * | 3/2005 | Bodin et al. | 296/146.6 |

FOREIGN PATENT DOCUMENTS

| | | |
|---|---|---|
| DE | 4405295 C1 | 3/1995 |
| EP | 0395621 A1 | 10/1990 |

* cited by examiner

Primary Examiner—Kiran B. Patel
(74) Attorney, Agent, or Firm—Crowell & Moring LLP

(57) ABSTRACT

A side impact protection device has a side impact carrier and a fastening device for the side impact carrier on a motor vehicle door part. The fastening device has at least one console and a holding bolt which reaches through the console and an end section of the side impact carrier in respective fastening openings. To simply fasten the side impact carrier, at least one load-alleviating opening is constructed at a distance, viewed in the longitudinal range of the side impact carrier, behind the fastening opening in the side impact carrier or in the console, and a material projection, as a deformation resistance, is situated between the fastening opening and the load-alleviating opening. After deformation of the deformation resistance, the holding bolt enters into the load-alleviating opening. The longitudinal axis of the holding bolt extends approximately parallel to the principal axis of inertia relevant to the load case of the side impact carrier.

24 Claims, 4 Drawing Sheets

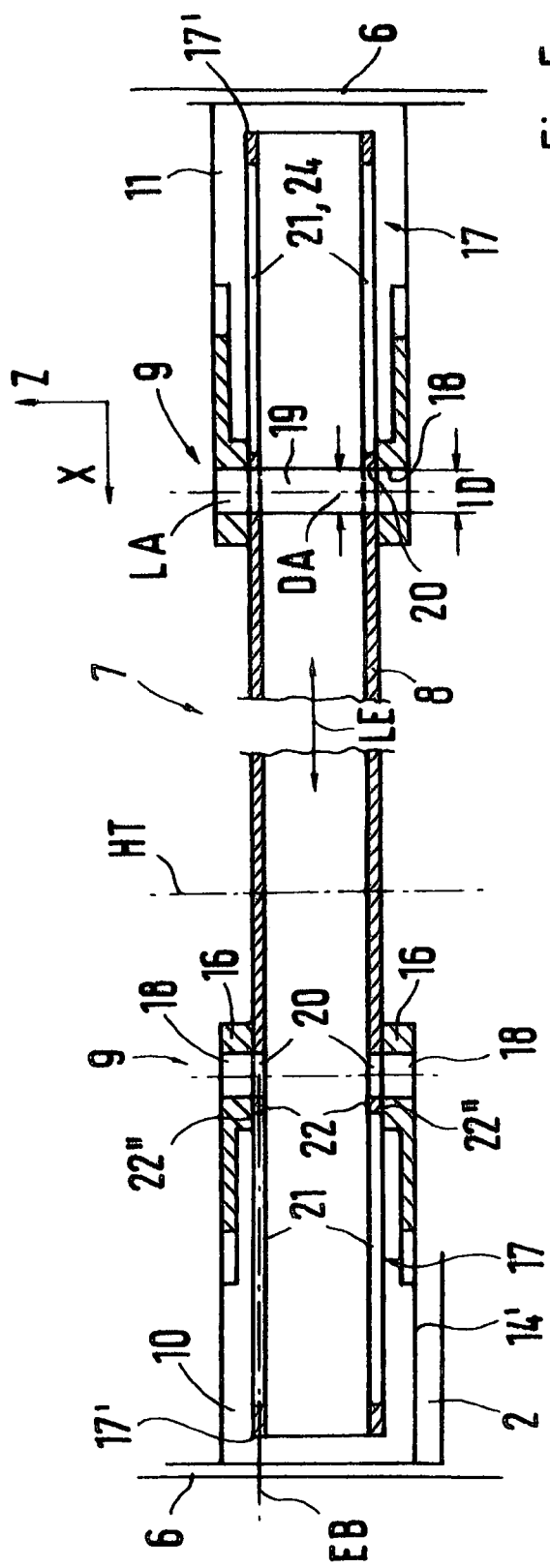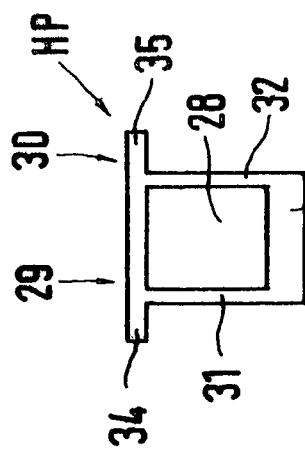

SIDE IMPACT PROTECTION DEVICE AS WELL AS MOTOR VEHICLE DOOR HAVING A SIDE IMPACT PROTECTION DEVICE

This application claims the priority of German application 103 20 971.9, filed May 9, 2003, the disclosure of which is expressly incorporated by reference herein.

BACKGROUND AND SUMMARY OF THE INVENTION

This invention relates to a side impact protection device including a side impact carrier, and a fastening device for the side impact carrier on a motor vehicle door part, the fastening device having at least one console and a holding bolt which reaches through respective fastening openings in the console and an end section of the side impact carrier, as well as to a motor vehicle door having such a side impact protection device.

A side impact protection device of the initially mentioned type is known from German Patent Document DE 44 05 295 C1. This side impact device includes a side impact carrier as well as a fastening device for fastening the side impact carrier to a motor vehicle door frame. The fastening device comprises a console which is formed by an extension of the door frame. The fastening device also has a screw as a holding bolt which reaches through the console as well as an end section of the side impact carrier in fastening openings. The longitudinal axis of the holding bolt extends at a right angle with respect to the principal axis of inertia of the side impact carrier which is relevant in the event of a load (side impact). During a bending operation of the side impact carrier, bending forces are introduced into the console. Furthermore, when the side impact carrier is deflected, tensile forces occur which cause a relative displacement between the side impact carrier and the console. During the relative displacement, a ramp-type bevel has an effect on the console and on the side impact carrier, respectively, whereby tensile forces are built up in the direction of the longitudinal axis of the holding bolt. In the side impact protection device, the forces acting on the side impact carrier are directly transmitted into the fastening device with the holding bolt as well as the console and thus also into the motor vehicle door frame.

It is an object of the invention to provide a side impact protection device of the initially mentioned type and a motor vehicle door having such a side impact protection device in which the device has a simple design and, in particular, has a fastening device which is subjected to low stress in the event of a load.

This object is achieved by a side impact protection device as mentioned above in which at least one load-alleviating opening is constructed in the side impact carrier or in the console at a distance, viewed in a longitudinal range of the side impact carrier, behind at least one of the fastening openings, in which, as a deformation resistance, a material projection is situated between the at least one of the fastening openings and the load-alleviating opening so that, after deformation of the deformation resistance, the holding bolt can enter into the load-alleviating opening, and in which a longitudinal axis of the holding bolt extends approximately parallel to a principal axis of inertia relevant to a load of the side impact carrier, as well as by a motor vehicle door having a side impact protection device with such features. Additional characteristics further developing the invention are included in corresponding dependent claims.

Principal advantages achieved by the invention include that, in the event of a load during a side or pole impact, after deformation of the deformation resistance (desired breaking point), the side impact carrier is guided with its load-alleviating opening over the holding bolt at the console, and the connection point between the console and the side impact carrier is therefore subjected to a lower stress. A further rise of the tensile forces in the motor vehicle door part is thereby prevented. During the bending strain as a result of the side impact, the side impact carrier can move relative to the console without introducing relevant moments or forces by way of the holding bolt into the console. Lower moments therefore have to be compensated for in the console and thus in the motor vehicle door part. In addition, the side impact protection device according to the invention is distinguished by a simple construction which, in contrast to the state of the art, requires no additional parts.

The deformation resistance can be formed by a tearing web which is continuous and which separates the fastening opening from the load-alleviating opening and represents the desired breaking point. As an alternative, the fastening opening and the load-alleviating opening can be implemented as a joint opening which has a keyhole-type contour, so that the deformation resistance is present in the transition area between the two hole sections.

In a preferred embodiment, the load-alleviating opening is constructed as an elongated hole which extends in the direction of the longitudinal range of the side impact carrier, so that, after the deformation resistance is overcome, the side impact carrier can be elongated without correspondingly introducing tensile forces into the holding bolt or the console and thus into the door part.

In another embodiment, several load-alleviating openings can be arranged behind one another, between which, in each case, another tearing web or a deformation resistance is situated. The tearing webs are each used as a desired breaking point when, as a result of the elongation of the side impact carrier, correspondingly high tensile forces are present between the holding bolt and the corresponding tearing web. As a result, the introduction of force into the door part can be controlled.

If the width of the load-alleviating opening is larger than the outside diameter of the holding bolt, then, after the tearing web fails, the side impact carrier can place itself against the console. The motor vehicle door part is therefore loaded in an essentially moment-free manner and has to absorb mainly supporting forces.

In another embodiment, the elongated hole can narrow in a hole section facing away from the fastening opening, specifically such that the width in this hole notch is, at least in areas, smaller than the outside diameter of the holding bolt. Consequently, although moments/forces are introduced into the door part, the bending strain of the side impact carrier and thus the penetration depth of an object during the side impact can be influenced.

In certain embodiments, it is advantageous that, after deformation of the deformation resistance, the side impact carrier can place itself against the console and absorb the supporting forces.

In the following, embodiments of the invention will be explained in detail with reference to the drawings.

BRIEF DESCRIPTION OF THE DRAWINGS

FIGS. 5 and 6 are respective sectional views along lines V—V and VI—VI in FIG. 2.

DETAILED DESCRIPTION OF THE INVENTION

Figure 1:
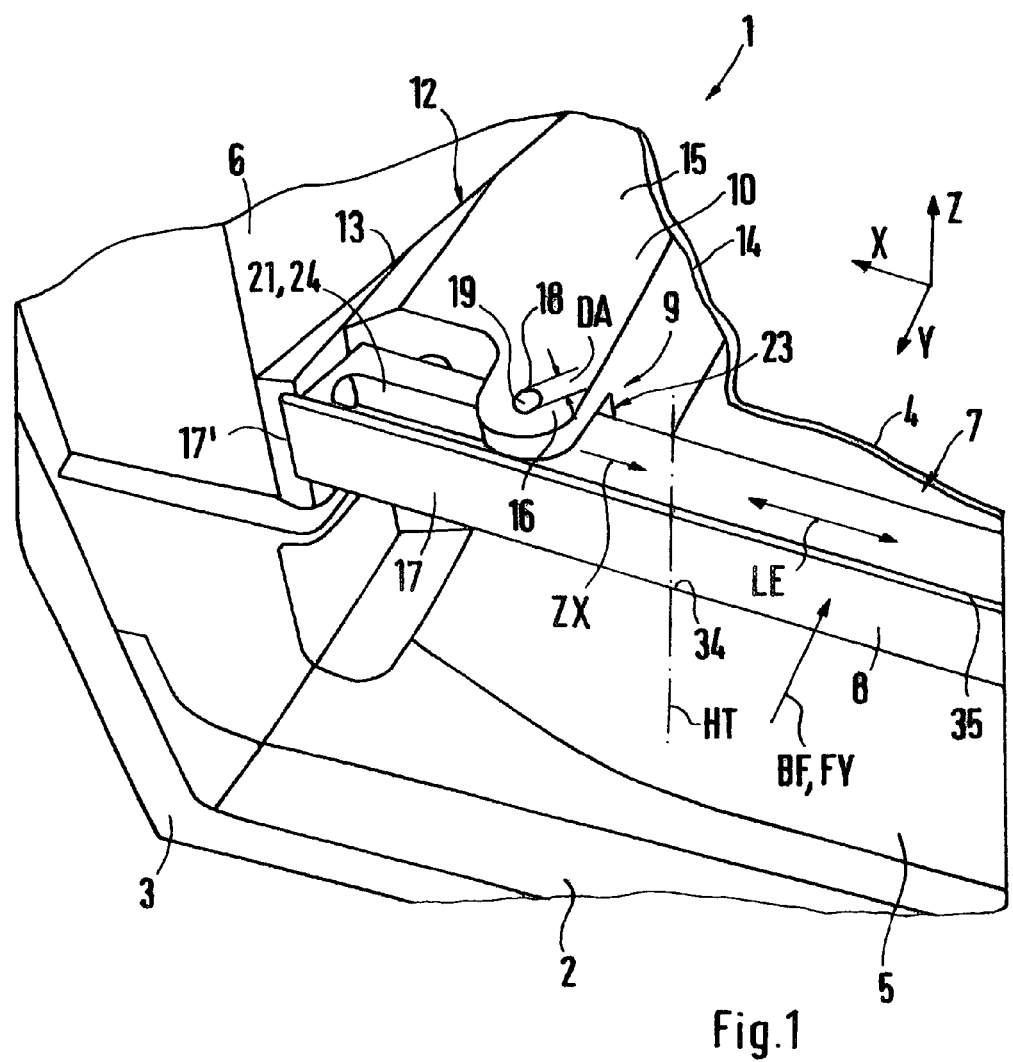
FIG. 1 is a cutout view of a motor vehicle door with a side impact protection device according to a first embodiment of the invention.

FIG. 1 illustrates a cutout of a motor vehicle door which in the following is called the door 1. The door 1 may be constructed in several parts; thus, the door may have several assembled motor vehicle door parts, of which a frame-type, in particular, a surrounding motor vehicle door part 2 is shown as an example, which is also called an interior door part, onto which an exterior door part, particularly an outside panel, is fastened. In the further description, the motor vehicle door part 2 is only called a door part 2. The door part 2 may be composed of several individual parts or may be produced in one piece. In particular, the door part 2 is implemented in one piece as a light-metal casting. It has an exterior flange 3 to which an outer skin (not shown) or an outside panel can be fastened as an exterior part. An interior flange 4 is used for the fastening of an inner door panel or an inside lining not shown here. In FIG. 1, a lower, transversely extending frame leg 5 is partially shown and an essentially upright extending frame leg 6 of the door part 2 is shown as a cutout, which frame leg 6 is arranged adjacent to the A-column (not shown) of the motor vehicle body and extends, for example, approximately parallel to this A-column. A second upright frame leg 6 of the door part 2 is illustrated in FIG. 5 and comes to be located adjacent to the B-column (not shown) when the door 1 is closed. However, the door 1 could also be arranged between the B-column and the C-column.

The door 1 is equipped with a side impact protection device 7 which has a side impact carrier 8 and a fastening device 9 by means of which the side impact carrier 8 can be fastened to the door part 2. The side impact carrier 8 extends transversely between the two mutually spaced, upright frame legs 6 (FIG. 5), so that the side impact carrier 8 extends parallel or at an angle with respect to the lower frame leg 5. FIG. 5 shows that the fastening device 9 comprises consoles 10 and 11 used for the fastening of the side impact carrier 8, each of these consoles 10 and 11 being arranged on one of the frame legs 6 and holding the side impact carrier 8 approximately on the end side. The consoles 10 and 11 can be connected with the corresponding frame leg 6, for example, by screws or, if required, can be produced in one piece with the door part 2, particularly when the door part 2 is produced as a light-metal casting. The consoles 10 and 11 respectively can also be cast as insertion pieces into the door part 2.

In the illustrated embodiment, the consoles 10 and 11 are each inserted into a receiving bed 12, in which they are supported, for example, on a forward contact surface 13, a rearward contact surface 14 or, as required, a lower contact surface 14' (FIG. 5), so that a supporting of the consoles 10 and 11 exists in the X-, Y- and Z-direction.

In the essential further developments, the consoles 10 and 11 may basically have identical constructions. In the following, only console 10 will therefore be described in detail. The console has a block-type basic body 15 which is used for the fastening or connection with the door part 2 and rests against the contact surfaces 13, 14 and 14'. Two extensions 16, which are spaced with respect to one another in the z-direction, originate in one piece from the basic body 15 so that a fork-type receiving device is constructed for an end section 17 of the side impact carrier 8. The end section 17 of the side impact carrier is therefore situated between the two extensions 16. Each extension has a first fastening opening 18 through which a holding bolt 19 is fitted which can be constructed, for example, as a screw fastened in the console 10 and 11 respectively. The holding bolt 19 also reaches through second fastening openings 20 provided in the area of the end section 17 of the side impact carrier 8. The first and/or second fastening openings 18, 20 are adapted by means of their inside diameter ID (FIG. 5) to the outside diameter DA of the holding bolt 19, so that the holding bolt 19 is essentially held in a play-free manner. As an alternative, it would be possible to enlarge the first and/or second fastening openings 18 and or 20 in the X-direction in order to provide a length—tolerance compensation.

In the direction of the longitudinal range LE of the side impact carrier 8, load-alleviating openings 21 are made in the end section 17 behind the second fastening openings 20 in the side impact carrier 8, which load-alleviating openings 21 are situated in the X-direction at a distance from the fastening opening 20 in the side impact carrier 8 adjacent to its end 17', so that a deformable deformation resistance 22' is in each case arranged between the fastening openings 20 and the load-alleviating openings 21, which deformation resistance 22' is formed by a tearing web 22 constructed as a material projection 22", which, as the desired breaking point fails, in the event of a load (arrow BF), during a side impact at a force FY, the force FY having at least one force component whose active line is oriented in the Y-direction. In this case, the side impact carrier 8, while being stressed by bending, is deformed correspondingly and may, in addition, be elongated or lengthened in the direction of its longitudinal range LE, whereby tensile forces ZX are operative which have at least one force component in the X-direction and are transmitted by way of the, for example, continuous tearing web 22 to the holding bolt 19. According to an alternative, which is not shown, the load-alleviating openings 21 at the console 10 can be made in the extensions 16. However, in contrast to the illustrated embodiment, the load-alleviating openings 21—viewed in the longitudinal range LE—would be arranged in front of the fastening openings 18. Although in FIG. 5, the two end sections 17 of the side impact carrier 8 are equipped with one fastening device respectively 9 having the deformation resistance 22', in an alternative which is not shown, only one of the two end sections 17 may be correspondingly linked to the door part 2, so that, in one of the two end sections, only the fastening openings 20 are provided and, in the corresponding console 10 or 11, the fastening openings 18 are made through which the holding bolt 19 is fitted or screwed.

Figure 2:
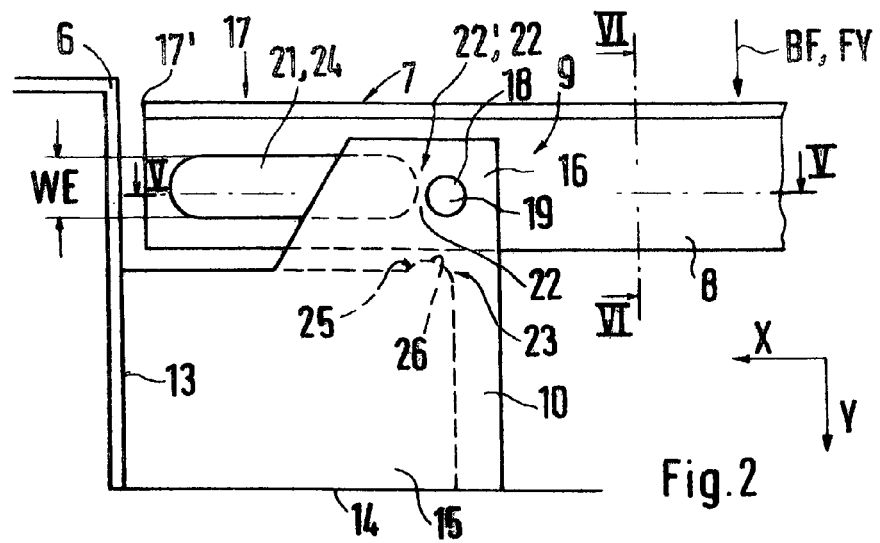
FIGS. 2 to 4 are views of the side impact protection device in different deformation conditions.
Figure 3:
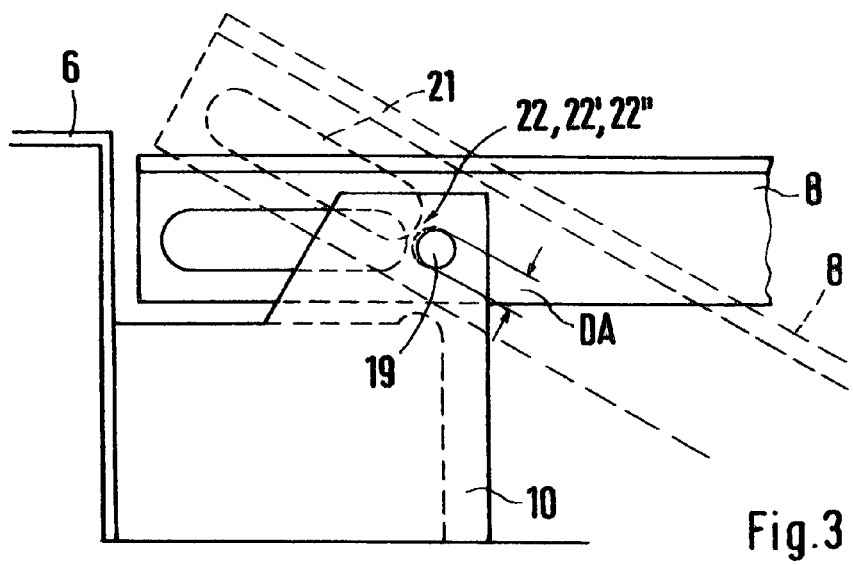
Figure 4:
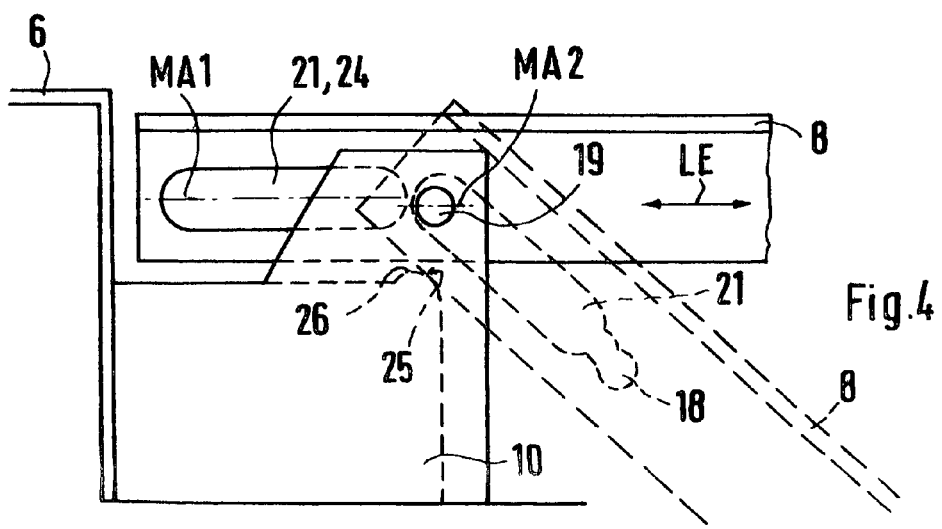

By means of FIGS. 2 to 4, the load BF in the event of a side impact is described in detail by means of the different degrees of deformation of the side impact carrier 8. The same parts or parts having the same effect as in FIGS. 1 and 5 are provided with the same reference numbers in FIGS. 2 to 4. In FIG. 2, the side impact protection device 7 with the side impact carrier 8 are illustrated in an undeformed initial position. It is illustrated that, while forming a gap 23, the side impact carrier 8 is situated at a distance from the basic body 15 of the console 10. In this initial position, the side impact carrier 8 is connected with the console 10 by means of the holding bolt 19. When the force FY is in effect, the side impact carrier 8 is subjected to a bending strain and deforms correspondingly as function of the amount of the occurring force FY. In FIG. 3, the side impact carrier 8 deformed by bending is indicated by a broken line. As a result of its swivelling bearing around the holding bolt 19 extending in the Z-direction, the bent side impact carrier 8 is swivelled clockwise, so that its end section 17 moves out of the fork-type accommodation of the extensions 16. By means of the bending as a result of the introduction of the force FY, the side impact carrier 8 is also strained by tension, so that the tensile force ZX has an effect on the holding bolt 19 and the deformation resistance 22' or the tearing web 22 is correspondingly plastically deformed by the action of the force, until the holding bolt 19 moves through the material of the side impact carrier 8 in the direction of the load-alleviating opening 21 situated behind, and the tearing web 22 finally fails completely, or the deformation resistance 22' is overcome by deformation and the holding bolt 19 has entered into the load-alleviating opening 21, which is indicated in FIG. 4 in the case of the side impact carrier shown by the broken line. When the holding bolt 19 cuts the tearing web 22 or has overcome, thus, deformed, the deformation resistance 22', no tensile forces ZX are transmitted to the holding bolt 19, whereby no moments and tensile forces are introduced into the console 10 or into the door part 2 by way of the holding bolt 19. This is advantageous particularly with respect to materials for the door part 2, which materials have low characteristic strength values, for example, extension.

FIGS. 2 to 4 show that the width WE of the load-alleviating opening 21 implemented as the elongated hole 24, which width is measured in the Y-direction, is greater than the outside diameter DA of the holding bolt 19. During the tearing-apart of the web 22, the side impact carrier 8 can close the gap 23 and place itself on a support 25 which is constructed on the basic body 15 of the console 10 and faces the side impact carrier 8. In a preferred embodiment, the support 25 has a curved support surface 26, so that, when the deflections differ, the side impact carrier 8 can roll off on the support 25. By means of the support 25, the side impact carrier 8 is supported in the Y-direction on the console 10, the connection by way of the holding bolt 19 being present essentially in a load-free manner. The basic body 15 of the console 10 and thus the door part 2 therefore only has to absorb supporting forces in the Y-direction and is therefore loaded without relevant moments. According to FIG. 5, it is demonstrated in this respect that the respective longitudinal axis LA of the holding bolts extends parallel to the upright frame legs 6 or to the frame legs 6 of the door part 2 which extend approximately parallel to the Z-direction. However, the frame legs 6 may also enclose an angle with a vertical line (Z-direction). In every case, the longitudinal axis LA of the holding bolt 19 is aligned corresponding to the principal axis of inertia HT of the side impact carrier 8 relevant to the loading case BF; it is therefore oriented approximately parallel thereto.

Figure 7:
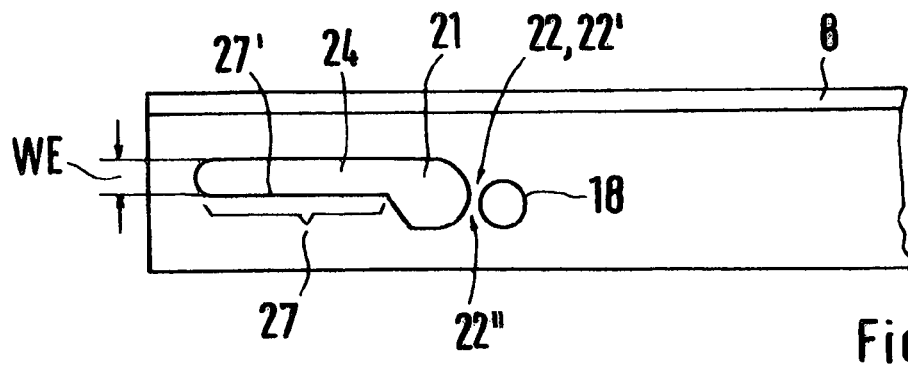
FIGS. 7 to 9 are views of another embodiment of a side impact protection device with different load-alleviating openings.

By means of FIGS. 7 to 9, embodiments for differently designed load-alleviating openings 21 will be explained in the following. In FIG. 7, the elongated hole 24 is constructed in a tapered manner in a hole section 27 spaced away from the fastening opening 18. In this case, the width WE of the tapered hole section 27 measured in the Y-direction may be smaller than the outside diameter DA of the holding bolt so that, when the holding bolt 19 enters into the hole section 27, a material deformation of the edge area 27' of the side impact carrier 8 occurs which surrounds the hole section 27. The tapered hole section 27 may be located at a larger distance from the basic body 15 of the console 10, so that, when the tearing web 22 has been cut through, it is ensured that the side impact carrier 8 is placed on the support surface 26.

Figure 8:
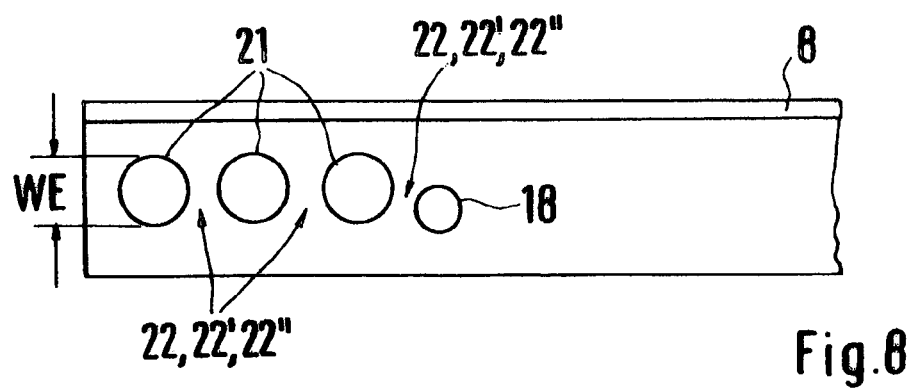

In the embodiment illustrated in FIG. 8, viewed in the longitudinal range LE, several, possibly circular load-alleviating openings 21 are arranged behind one another at a distance from one another, so that one tearing web 22 respectively is constructed between adjacent load-alleviating openings 21, which tearing web 22, like the tearing web 22 between the load-alleviating opening 21 and the fastening opening 18, is used as a desired breaking point. The width WE of the load-alleviating openings 21 may be smaller or larger than the outside diameter DA or may be equal to the outside diameter DA of the holding bolt 19. However, it would also be conceivable to further develop the load-alleviating openings 21 arranged behind one another to have a different width WE.

Figure 9:
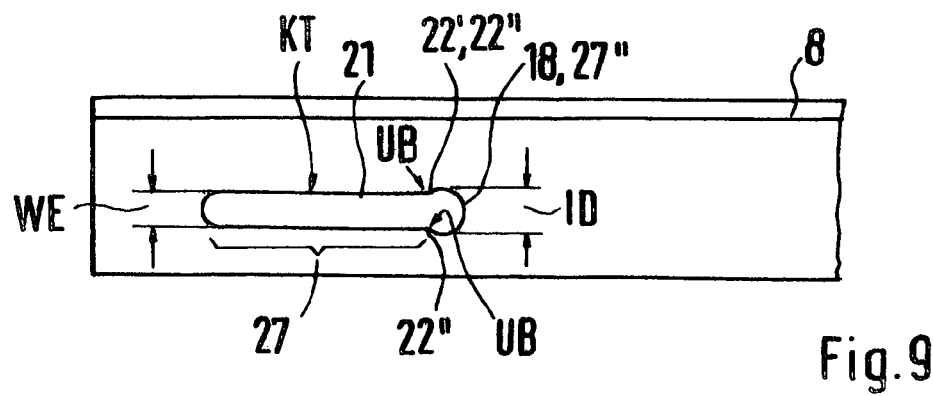

FIG. 9 illustrates another embodiment of a load-alleviating opening 21 which is constructed in a continuous manner with the fastening opening 18 or 20, thus as a joint opening whose contour KT is of the type of a keyhole. The elongated hole section 27 is connected with the circular hole section 27", which represents the fastening opening 18 or 20. The deformable deformation resistance 22' or the deformation resistance 22' to be overcome is formed here at the narrowing transition section UB by the material projection 22" between the two hole sections 27 and 27". The width WE of the elongated hole section 27 is smaller than the inside diameter ID of the circular hole section 27".

FIG. 4 also shows that the load-alleviating opening 21—in the illustrated embodiment, the elongated hole 24—may be situated to be offset transversely to the longitudinal range LE with respect to the fastening opening 18 and 20 respectively. In this case, the longitudinal center axis MA1 of the load-alleviating opening 21 is arranged with a lateral offset with respect to the center axis MA2 of the fastening opening 18 and 20 respectively. However, as an alternative, the longitudinal center axis MA1 and the center axis MA2 may be aligned or extend at an angle with respect to one another. Naturally, the described embodiments of the various load-alleviating openings 21 can be combined with one another. In all embodiments, the material projection 22" forming the deformation resistance 22' is situated at least partially in the plane EB of the load-alleviating opening 21. It would also be conceivable to assign the side impact protection device 7 to a side wall of the motor vehicle which has no door.

The side impact carrier 8 is described in greater detail by means of FIG. 6. It is implemented as a hollow profile HP with a central recess 28 and, in particular, is constructed as an extruded hollow profile. The profile is composed such of two T-shaped partial profiles 29 and 30, which change into one another, so that the profile sections 31 and 32 extending parallel to one another are mutually connected by way of a base 33. The aligned upper T-pieces 34 and 35 change into one another. The profile sections 31 and 32 may have the same material thickness as the T-pieces 34 and 35 or may be thicker or thinner. The base 33 may have a reinforced construction in comparison to the other profile walls. In connection with FIGS. 1 and 2 respectively, it becomes clear that the side impact carrier 8 is aligned with respect to the load case BF such that the T-pieces 34 and 35 are situated so as to be facing away from the console 10 and 11 respectively or extend parallel to the outside door panel not shown here. The fastening openings 20 and the load-alleviating openings 21 are therefore made in the profile legs 31 and 32.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A side impact protection device comprising:
   a side impact carrier, and
   a fastening device for the side impact carrier on a motor vehicle door part, the fastening device having at least one console and a holding bolt which reaches through respective fastening openings in the console and an end section of the side impact carrier,
   wherein at least one load-alleviating opening is constructed in the side impact carrier or in the console at a distance, viewed in a longitudinal range of the side impact carrier, behind at least one of the fastening openings,
   wherein, as a deformation resistance, a material projection is situated between the at least one of the fastening openings and the load-alleviating opening so that, after deformation of the deformation resistance, the holding bolt can enter into the load-alleviating opening, and
   wherein a longitudinal axis of the holding bolt extends approximately parallel to a principal axis of inertia relevant to a load of the side impact carrier.

2. The side impact protection device according to claim 1, wherein the deformation resistance is formed by a tearing web.

3. The side impact protection device according to claim 1, wherein the load-alleviating opening is constructed as an elongated hole which extends approximately in the direction of the longitudinal range of the side impact carrier.

4. The side impact protection device according to claim 2, wherein the load-alleviating opening is one of several load-alleviating openings which, viewed in the longitudinal range of the side impact carrier, are arranged behind one another, and wherein at least one other tearing web is situated between two adjacent load-alleviating openings.

5. The side impact protection device according to claim 1, wherein the console has a support for the side impact carrier, and wherein the side impact carrier places itself against the support when the deformation resistance has been deformed and the holding bolt has entered the load-alleviating opening.

6. The side impact protection device according to claim 1, wherein a width of the load-alleviating opening is larger than an outside diameter of the holding bolt.

7. The side impact protection device according to claim 3, wherein a width of the elongated hole narrows in a hole section facing away from the fastening opening, and wherein the width in this hole section is, at least in sections, smaller than an outside diameter of the holding bolt.

8. The side impact protection device according to claim 1, wherein a width of the load-alleviating opening is smaller than an outside diameter of the holding bolt.

9. The side impact protection device according to claim 8, wherein the load-alleviating opening and the fastening opening have continuous constructions with a keyhole-shaped contour.

10. The side impact protection device according to claim 1, wherein a width of the load-alleviating opening is equal to an outside diameter of the holding bolt.

11. The side impact protection device according to claim 7, wherein, viewed transversely to the longitudinal range of the side impact carrier, the load alleviating opening is arranged to be offset with respect to the fastening opening.

12. The side impact protection device according to claim 1, wherein the side impact carrier is constructed as an extruded light-metal profile and the console is constructed as a light-metal casting.

13. The side impact protection device according to claim 1, wherein the side impact carrier is implemented as a closed hollow profile.

14. The side impact protection device according to claim 5, wherein the support is constructed as a projection and has a curved support surface.

15. The side impact protection device according to claim 8, wherein, viewed transversely to the longitudinal range of the side impact carrier, the load alleviating opening is arranged to be offset with respect to the fastening opening.

16. The side impact protection device according to claim 12, wherein the side impact carrier is implemented as a closed hollow profile.

17. A motor vehicle door having a side impact protection device comprising:
   a side impact carrier, and
   a fastening device for the side impact carrier on a motor vehicle door part, the fastening device having at least one console and a holding bolt which reaches through respective fastening openings in the console and an end section of the side impact carrier,
   wherein at least one load-alleviating opening is constructed in the side impact carrier or in the console at a distance, viewed in a longitudinal range of the side impact carrier, behind at least one of the fastening openings,
   wherein, as a deformation resistance, a material projection is situated between the at least one of the fastening openings and the load-alleviating opening so that, after deformation of the deformation resistance, the holding bolt can enter into the load-alleviating opening, and
   wherein a longitudinal axis of the holding bolt extends approximately parallel to a principal axis of inertia relevant to a load case of the side impact carrier.

18. The motor vehicle door according to claim 17, wherein the console is constructed in one piece with the vehicle door part.

19. The motor vehicle door according to claim 17, wherein the motor vehicle door part and the console are produced as a light-metal casting.

20. The motor vehicle door according to claim 17, wherein the motor vehicle door part is constructed in a frame type manner with two mutually spaced, approximately upright-extending frame legs, wherein the console is arranged on at least one of the frame legs, and wherein the side impact carrier extends transversely between the two frame legs.

21. The motor vehicle door according to claim 18, wherein the longitudinal axis of the holding bolt extends approximately parallel to the vertical frame leg.

22. The motor vehicle door according to claim 19, wherein the console is cast into the motor vehicle door part.

23. The motor vehicle door according to claim 18, wherein the motor vehicle door part and the console are produced as a light-metal casting.

24. The motor vehicle door according to claim 17, wherein the console is cast into the motor vehicle door part.

* * * * *